United States Patent
Dobrek et al.

(10) Patent No.: US 10,146,792 B1
(45) Date of Patent: Dec. 4, 2018

(54) SYSTEMS AND METHODS FOR IMPLEMENTING A PROGRAMMING MODEL FOR SMART CONTRACTS WITHIN A DECENTRALIZED COMPUTER NETWORK

(71) Applicant: SYMBIONT.IO, INC., New York, NY (US)

(72) Inventors: Lukasz Dobrek, Ossining, NY (US); Adam Krellenstein, New York, NY (US); Ouziel Slama, Bordeaux (FR); Pankaj Surana, New York, NY (US); Aaron Todd, New York, NY (US)

(73) Assignee: SYMBIONT.IO, INC., New York, NY (US)

( * ) Notice: Subject to any disclaimer, the term of this patent is extended or adjusted under 35 U.S.C. 154(b) by 0 days.

(21) Appl. No.: 15/994,714

(22) Filed: May 31, 2018

Related U.S. Application Data

(60) Provisional application No. 62/512,997, filed on May 31, 2017, provisional application No. 62/512,988, filed on May 31, 2017.

(51) Int. Cl.
*G06F 21/53* (2013.01)
*G06F 17/30* (2006.01)
*G06Q 20/38* (2012.01)
*H04L 9/32* (2006.01)

(52) U.S. Cl.
CPC ... *G06F 17/30206* (2013.01); *G06Q 20/3829* (2013.01); *H04L 9/32* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 2017/0330159 A1* | 11/2017 | Castinado | G06Q 20/02 |
| 2017/0352012 A1* | 12/2017 | Hearn | G06Q 20/065 |
| 2018/0018738 A1* | 1/2018 | Bernauer | G06Q 40/12 |
| 2018/0117447 A1* | 5/2018 | Tran | G06Q 20/00 |
| 2018/0254898 A1* | 9/2018 | Sprague | H04L 9/0866 |
| 2018/0262493 A1* | 9/2018 | Andrade | H04L 63/0861 |

OTHER PUBLICATIONS

Solidity Documentation, Release 0.4.4 dated Feb. 13, 2017, retrieved from: https://solidity.readthedocs.io/en/v0.4.4/introduction-to-smart-contracts.html on Aug. 15, 2018. (Year: 2017).*
Ethereum Homestead Documentation, Release 0.1, Dated Mar. 1, 2017, Downloaded from: https://media.readthedocs.org/pdf/ethereum-homestead/latest/ethereum-homestead.pdf on Aug. 20, 2017. (Year: 2017).*

* cited by examiner

*Primary Examiner* — John W Hayes
*Assistant Examiner* — Jason B Fenstermacher
(74) *Attorney, Agent, or Firm* — Knobbe, Martens, Olson & Bear, LLP

(57) ABSTRACT

Computer-implemented methods and systems for implementing smart contract modules on a decentralized network are disclosed.

17 Claims, 3 Drawing Sheets

SYSTEMS AND METHODS FOR IMPLEMENTING A PROGRAMMING MODEL FOR SMART CONTRACTS WITHIN A DECENTRALIZED COMPUTER NETWORK

CROSS-REFERENCE TO RELATED APPLICATIONS

This application claims priority to and benefit of U.S. Provisional Patent Application No. 62/512,988, filed on May 31, 2017, and U.S. Provisional Patent Application No. 62/512,997, filed on May 31, 2017; the entirety of each of the aforementioned applications are herein expressly incorporated by reference in its entirety.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

Blockchain technology and distributed ledger technology are recent developments within software engineering that promise to significantly change the way that people share data in decentralized networks.

SUMMARY

In some aspects of the disclosure, a computer-implemented infrastructure and programming model for smart contracts is provided. According to some embodiments of the disclosure, a computer-implemented method for implementing a smart contract module on a decentralized network is disclosed. The decentralized network can be configured to enable peer-to-peer connection amongst a plurality of nodes. The computer-implemented method includes publishing the smart contract module to the decentralized network. The smart contract module is published via at least one node in the plurality of nodes. The smart contract module can include at least one function. The computer-implemented method also includes triggering execution of a client-side functionality in the at least one function at a first node in the plurality of nodes. The client-side functionality can be triggered in response to a request places via the first node's Application Programming Interface (API). In response to the execution of the client-side functionality on the first node, the computer-implemented method further includes accessing a state of the first node from a storage associated with the smart contract module and defining/constructing zero or more transactions. The computer-implemented method further includes broadcasting the at least one transaction on the decentralized network to generate a broadcasted transaction. In response to the broadcasted transaction, each node in the plurality of nodes can execute a server-side functionality in the at least one function. The broadcasted transaction can include an identifier for the server-side functionality. In response to executing the server-side functionality, each node in the plurality of nodes can construct/define zero or more transactions, broadcast the transaction(s), and/or read a node state, change a corresponding state of at least a portion of nodes, and/or generate other side effects.

In some implementations, the client-side functionality in the at least one function is configured to provide read-only access to the first node's storage. In some implementations, the server-side functionality in the at least one function is configured to provide write access to a corresponding storage associated with the smart contract module in each node in the plurality of nodes.

In some implementations, the computer-implemented method further includes in response to the execution of the client-side functionality on the first node, transmitting a result of a computation based on the state of the first node via the first node's API. In some implementations, the computer-implemented method further includes in response to executing the server-side functionality on each node in the plurality of nodes, triggering a side effect on that node. In some implementations, the side effect could include constructing/broadcasting transactions, PUSH events, and/or the like.

In some implementations, the at least one transaction includes a plurality of transactions and broadcasting the at least one transaction can include ordering the plurality of transactions by a distributed consensus protocol to generate a global order of transactions. In some implementations, the storage associated with the smart contract module is an isolated storage. In some implementations the storage associated with the smart contract module manages state associated with a logic corresponding to the smart contract module. In some implementations, implementing the smart contract module can further comprise triggering the transaction in a corresponding virtual machine on each node in the plurality of nodes in the decentralized network in response to the broadcasted transaction.

According to some embodiments of the disclosure, a computer-implemented method to enable a consistent view of data across a plurality of nodes in a decentralized network is disclosed herein. The computer-implemented method includes publishing a smart contract module to the decentralized network via at least one node in the plurality of nodes. The smart contract module can include at least one function. The computer-implemented method also includes at a first node in the plurality of nodes—in response to execution of a client-side functionality in the at least one function, broadcasting at least one transaction on the decentralized network to generate a broadcasted transaction. The computer-implemented method also includes for each node in the plurality of nodes: in response to the broadcasted transaction, executing a server-side functionality in the at least one function. The broadcasted transaction can include an identifier for the server-side functionality. And in response to executing the server-side functionality, the computer-implemented method includes for each node in the plurality of nodes, generating a unique pseudorandom ID value.

In some implementations, in response to executing the server-side functionality each node in the plurality of nodes can generate the same pseudorandom ID value in a deterministic manner using a decentralized network state as a seed.

According to some embodiments of the disclosure, a computer-implemented method includes publishing a set of smart contract modules to a decentralized network. The decentralized network can be configured to enable peer-to-peer connection amongst a plurality of nodes. The computer-implemented method also includes dynamically generating at least one API for at least a first node in the plurality of nodes based on the set of smart contract modules published on the decentralized network. The computer-implemented method also includes at the first node—receiving a request placed via the at least one API to trigger a client-side functionality. The client-side functionality can be included as at least one function in a smart contract module from the set of smart contract modules. In response to the execution of the client-side functionality on the first node, the computer-implemented method also includes: accessing a state of the first node from a storage associated with the smart contract module, and constructing at least one transaction. The computer-implemented method also includes broadcasting the at least one transaction on the decentralized network to generate a broadcasted transaction.

In some implementations, receiving the request can include receiving a request to trigger the broadcast of the at least one transaction. The at least one transaction can be configured to call a server-side functionality.

In some implementations, the computer-implemented method can further comprise: publishing a new smart contract module to the decentralized network; updating the set of smart contract modules with the new contract module; and dynamically generating at least a second API for the first node based on the updated set of smart contract modules.

In some implementations, the client-side functionality can include a built-in function to broadcast the at least one transaction on the decentralized network. In some implementations, the client-side functionality can include a built-in function to broadcast a plurality of transactions at a first time on the decentralized network.

According to some embodiments of the disclosure, a non-transitory computer processor-readable storage media is disclosed herein. The non-transitory computer processor-readable storage media can be encoded with instructions that when executed by at least one computer processor cause the at least one computer processor to perform operations. The instructions can comprise instructions to publish a smart contract module to a decentralized network. The smart contract module can include a client-side logic. The client-side logic can be configured to: construct/define zero or more transactions, broadcast the transaction(s), return a value, and/or read a node state. The smart contract can also include a server-side logic. The server-side logic can be configured to: construct/define zero or more transactions, broadcast the transaction(s), and/or read a node state, change a corresponding state of at least a portion of nodes, and/or generate other side effects.

In some implementations, the instructions are configured to use Command Query Responsibility Segregation (CQRS). In some implementations, the instructions can include a query, the query being configured to only call the client-side logic. In some implementations, the instructions include a command, the command being configured to construct the transaction and to broadcast the transaction. In some implementations, the smart contract module digitally represents behavior of a financial instrument in the decentralized network. In some implementations, the smart contract module maintains a single source of truth in the decentralized network, or has other consistency guarantees/properties. In some implementations, the smart contract module orchestrates and restricts behavior of multiple parties in multi-party workflows within the decentralized network.

According to some embodiments, a node includes or can be a computing device (e.g., computer, compute device, server, computing machine, data processor, information processing system, and/or the like) connected to a network.

According to some embodiments, a network includes or can be understood as a collection of nodes interlinked to one another. According to embodiments of the disclosure, a network can allow nodes to exchange data via data links (e.g., wires, optic cables, wireless media such as WiFi, and/or the like).

According to some embodiments, a decentralized network (also referred to herein as "decentralized computer network") can include a network that enables peer-to-peer (P2P) connection amongst nodes. Peers (e.g., nodes) can communicate with other network participants (e.g., other nodes within the network) that, in some embodiments, are hosted/administered/controlled by other parties. In some embodiments, a decentralized network may be a "blockchain" or "distributed ledger".

According to some embodiments, a smart contract can include, comprise, or be understood to be a computer program that can act as a "contract" (such as, contracts between people and organizations) by programmatically/logically controlling/governing the activity/behavior of nodes (instead of governing the behavior between people and/or organizations). According to some embodiments of the disclosure, a smart contract can be used to orchestrate and restrict the behavior of multiple compute device/parties, in multi-party workflows, within a decentralized computer network. For example, in financial markets, smart contracts can be used to digitally represent the actions/behavior of a financial instrument in a decentralized network. The term "smart contract" depending on the context may refer either to the contract module implementing application logic or to an agreement between and among multiple parties/nodes in a decentralized network.

According to some embodiments, a transaction (or transactions) can include a message (or messages/communications) from one node in the network to some or all other nodes within the network. In some embodiments, these messages can be sent via point-to-point communication. In some embodiments the messages can be encrypted. In some embodiments a cryptographic commitment to data can be sent and the data itself can be sent out-of-band. The content of a transaction can include events such as a trade, a quote, an indication of interest, a financial transaction, and/or the like. According to some embodiments of the disclosure, a transaction can be recorded/posted/broadcasted/published on a decentralized network. In some embodiments, the transaction can be cryptographically signed by some set of network nodes or by a party that is not a node. Once the transaction is posted on the decentralized network, the transaction can be observable by the entire (e.g., all nodes within the decentralized network) decentralized network or a portion (e.g., several, a few, or a plurality of nodes within the decentralized network) of the decentralized network. The visibility of the transaction can allow participants (i.e., one or more nodes) within the decentralized network to act upon the information within the content in the transaction.

In some embodiments, a contract module (or smart contract module, smart contract component, smart contract program) includes, defines, and/or provides logic for one or more smart contracts, which can be composed using/implemented with a programming language, such as a programming language disclosed herein, and published to the decentralized network. Transactions on the decentralized network can trigger contract modules that then execute the code within the contract modules on the nodes and/or virtual machines on the nodes. According to some embodiments of the disclosure, a programming language for composing the logic for smart contracts can include and/or be implemented as an embedded domain-specific language and/or in another programming language, such as Python™. It is to be understood that such logics can be implemented using and/or integrated into additional and/or alternative programming languages, and/or in a variety of other ways as well, without departing from the scope of the disclosure.

According to some embodiments, blockchain can include a decentralized database built on one or more shared transaction logs ("distributed logs"), authenticated data structures (e.g., Merkle trees), and/or the like. In some embodiments, a blockchain may be used to maintain a single source of truth (SSOT) or other consistency guarantees/properties in a decentralized network. Some non-limiting examples of blockchains include public blockchains, cryptocurrency networks, the Bitcoin blockchain, the Ethereum blockchain, private/permissioned blockchains, Hyperledger Fabric, Quorum, Corda, "distributed ledger technology" (DLT) systems, a combination thereof, and/or the like.

According to some embodiments, client-side logic can include logic of smart contracts and/or contract modules that can run on a single node in the decentralized network.

According to some embodiments, server-side logic can include logic of smart contracts and/or contract modules that can run on multiple nodes in the decentralized network.

It should be appreciated that all combinations of the foregoing concepts and additional concepts discussed in greater detail below (provided such concepts are not mutually inconsistent) are contemplated as being part of the subject matter disclosed herein. In particular, all combinations of the subject matter of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

Other systems, processes, methods, apparatuses, and features will become apparent upon examination of the following drawings and detailed description. It is intended that all such additional systems, processes, methods, apparatuses, and features be included within this description, be within the scope of the present disclosure.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
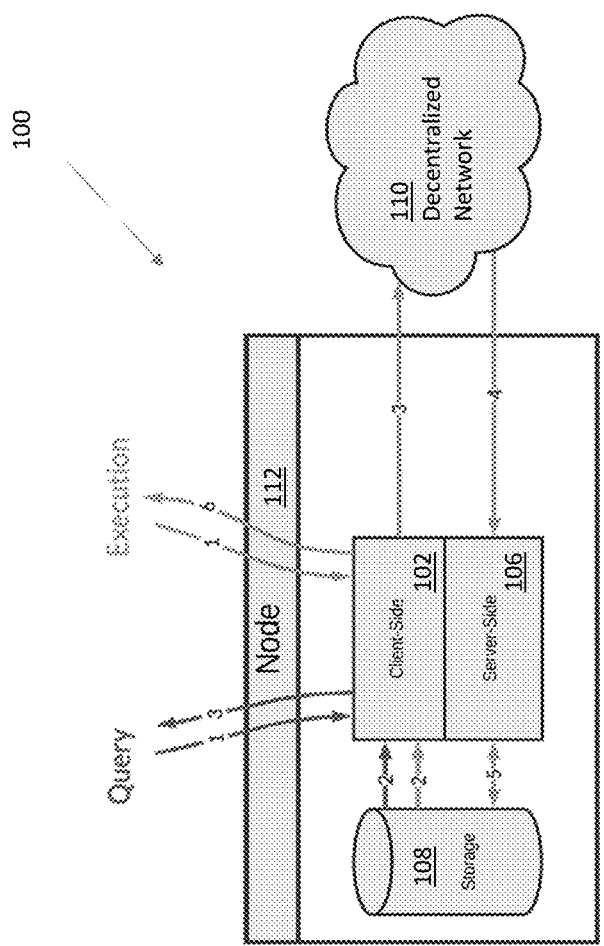
FIG. 1 illustrates the process by which a smart contract is queried or executed according to embodiments of this disclosure.

Following below are more detailed descriptions of various concepts related to, and implementations of, systems and methods for implementing smart contracts in a decentralized computer network. It should be appreciated that various concepts introduced above and discussed in greater detail below may be implemented in various manners, and that examples of specific implementations and applications are provided primarily for illustrative purposes.

Example High-Level Overview

In some systems, the logic of smart contracts and/or the contract modules are split as logic that can run on a single node (also referred to as "client-side" logic herein) and logic that can run on multiple nodes within the decentralized computer network (also referred to as "server-side" logic herein). Put differently, in such systems, client-side logic and server-side logic are implemented as separate code modules. However, the client-side logic and the server-side logic are tightly coupled. If two nodes in the decentralized network use the same server-side logic and not the same client-side logic, these two nodes might end up disagreeing (e.g., disagreeing about shared data). In known systems, the server-side logic is usually published on the decentralized network. However, these known systems are not enabled to publish client-side logic. Therefore, the unmet need to distribute and publish client-side logic consistently amongst the nodes in the decentralized network.

The present disclosure provides a programming language, and methods and systems for using a programming language/syntax, that enables the ability to support both client-side logic and server-side logic. Said another way, methods and systems of the disclosure can publish and/or distribute both the client-side logic and the server-side logic. According to some embodiments, methods and systems disclosed herein implement the client-side logic and the server-side logic as a single module. Therefore, methods and systems of the disclosure support logic that runs both on a single node and the decentralized computer network more broadly.

According to some implementations, a single node on the decentralized computer network can host one or more smart contracts. In some aspects, all changes to a node's state can be made by executing "server-side" logic, in order to maintain consistency in node state. "Client-side" logic can be used for read-only queries of node state. "Client-side" logic can also be used for constructing and broadcasting a transaction to the decentralized computer network which in turn can trigger the execution of "server-side" logic.

According to some implementations, each smart contract can run in isolation and can have an isolated storage associated with it. A smart contract can call (referred to as "caller") another smart contract (referred to as "callee") directly. The callee, however, will not have access to caller's storage. In some embodiments, the state of each node is the sum of the state of the storages of each smart contract that has been executed on that node. The state of a smart contract is the state of its storage.

Below is an example smart contract module. The logic underlying the example smart contract module can be implemented in a variety of other programming languages.

```
@clientside
def get_holders(token, dividend_amount):
    holders=STORAGE.get_holders(token)
    return holders
@clientside
def maybe_pay_dividend(token, dividend_amount):
    holders=STORAGE.get_holders(token)
    if len(holders)<100:
        POST_TRANSACTION(pay_dividend, token, dividend_amount)
        return true
    else:
        return false
```

```
@serverside
def pay_dividend(token, dividend_amount):
   holders=STORAGE.get_holders(token)
   for holder in holders:
   old_balance=STORAGE.get_balance(holder, token)
   STORAGE.set_balance(holder, token, old_balance+
      old_balance*dividend_amount)
```

FIG. 1 illustrates an example high-level implementation 100 of the query and execution of a smart contract according to embodiments of this disclosure. The smart contract module can be published to a decentralized computer network 110 by one of the nodes in the decentralized computer network 110. A user (e.g., a person or an external system that accesses the decentralized computer network 110, through a node, via the node's API) can then make an API request against a node 112 in the decentralized computer network 110 thereby triggering the execution of at least one client-side 102 function on the node 112. The smart contract module can read from its isolated storage 108, the state of the node 112 executing the at least one client-side 102 function and can construct a transaction.

For instance, the example contract module disclosed above could have a storage that comprises/stores data that represents the holders and their balances in a given token. The contract module can read from the local node state the list of holders of a token and can construct a transaction to pay a dividend to all of the participants in the decentralized computer network only if the total number of holders is less than 100.

The node 112 can broadcast this transaction on the decentralized computer network 110 which would then trigger the execution of the "server-side" 106 logic on every node in the decentralized computer network 110 thereby changing the states of nodes in the decentralized network 110 executing the server-side 106 logic. Thus, for the contract disclosed above, the changed state of the nodes in the decentralized computer network 110 could reflect the payment, manifesting as simultaneous dividend payment across the decentralized computer network 110. Thereafter, every node in the decentralized computer network 110 will "agree" (i.e., validate/match) that this dividend has been paid, a fact that is recorded in the local state of each node in the decentralized computer network 110.

According to embodiments of the disclosure, a transaction can comprise, include, and/or consist of a contract module name, function name and its arguments. When a node in the decentralized computer network 110 processes a transaction, that node loads the appropriate contract module and calls the function with the arguments. All nodes in the decentralized computer network 110 will eventually execute the server-side function in the same order with the same arguments. The version of the data available to the server-side function is pinned at the time of the request. If a request is made to execute a server-side function and the last processed transaction is #8, then the server-side function will only execute with a view at that specific version. Meanwhile, the decentralized computer network 110 might process a dozen more transactions, some of which may update the relevant data. Even if the version of the data is #20, the server-side function will "see" or process data at version #8 for the duration of the @client-side. This is similar to SNAPSHOT isolation in an SQL database.

Figure 2:
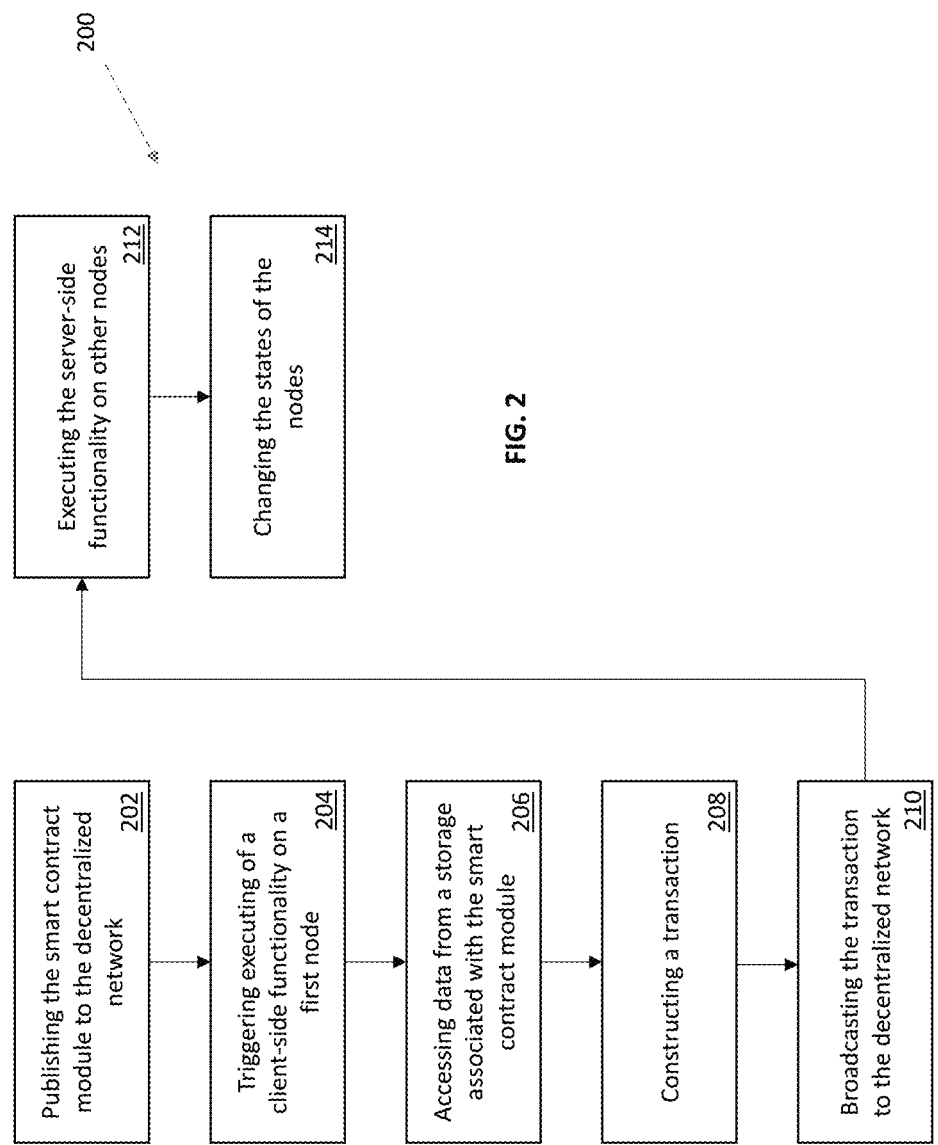
FIG. 2 is a flowchart illustrating an example method for executing a smart contract on a decentralized network.

FIG. 2 illustrates an example method 200 for executing a smart contract. At step 202, a node in the decentralized computer network publishes a smart contract module to the decentralized computer network. The smart contract module can include at least one function with client-side functionality (also referred to as "logic" herein) and server-side functionality. According to some embodiments of the disclosure, the smart contract module can include a first function representing the client-side functionality and a second function representing the server-side functionality. According to some embodiments of the disclosure, the smart contract module can include a single function that represents both the client-side functionality and the server-side functionality.

At step 204, a user can make a request via a first node's Application Programming Interface (API) to trigger execution of the client-side functionality in the smart module. For instance, a user can make a request to the first node's API with the smart contract module name, name of the client-side function and the arguments to the client-side function. In response, only that node (i.e., first node in this scenario) executes the client-side functionality. Put differently, in response to the execution of the client-side functionality on the first node, at step 206, the first node can access a state (e.g., state of the first node) from a storage associated with the smart contract module. The client-side functionality provides read-only access to the first node's storage. At step 208, the first node can construct a transaction. Put differently, one of the side effects of executing the client-side functionality on the first node includes creating/defining one or more new transactions. In some implementations, executing the client-side functionality may not create/construct/broadcast new transactions. At step 210, the first node can broadcast the new transactions on the decentralized network.

According to some embodiments of the disclosure, the one or more broadcasted transactions can include an identifier that is associated with the server-side functionality. At step 212, the broadcasted transactions can be executed on some or all nodes in the decentralized network thereby executing the server-side functionality on these nodes. The server-side functionality enables each node to read from and write to the storage associated with the smart contract module. For example, at step 214, in response to executing the server-side functionality, a corresponding state of the nodes can be changed.

According to some embodiments of the disclosure, in response to the execution of the client-side functionality (e.g., execution of the client-side functionality on the first node), the client-side functionality can return and fill the user's request with a return value. According to some embodiments of the disclosure, a result of a computation that is based on the state of the first node can be transmitted via the first node's API. According to some embodiments of the disclosure, in response to the execution of the server-side functionality, the server-side functionality can return and fill the user's request with a return value. According to some embodiments of the disclosure, triggering the server-side functionality can trigger a side effect on the node executing the server-side functionality. In some embodiments, this side effect may be pushing data onto a queue, such as for notification purposes.

According to embodiments of the disclosure, the language design disclosed herein uses Command Query Responsibility Segregation (CQRS). A query of the node state calls only a client-side function, and is read-only. A command (e.g., a command that can change the state of the node), involves creating/defining and broadcasting a transaction to the decentralized computer network, to be executed on the other nodes in the decentralized computer network.

Figure 3:
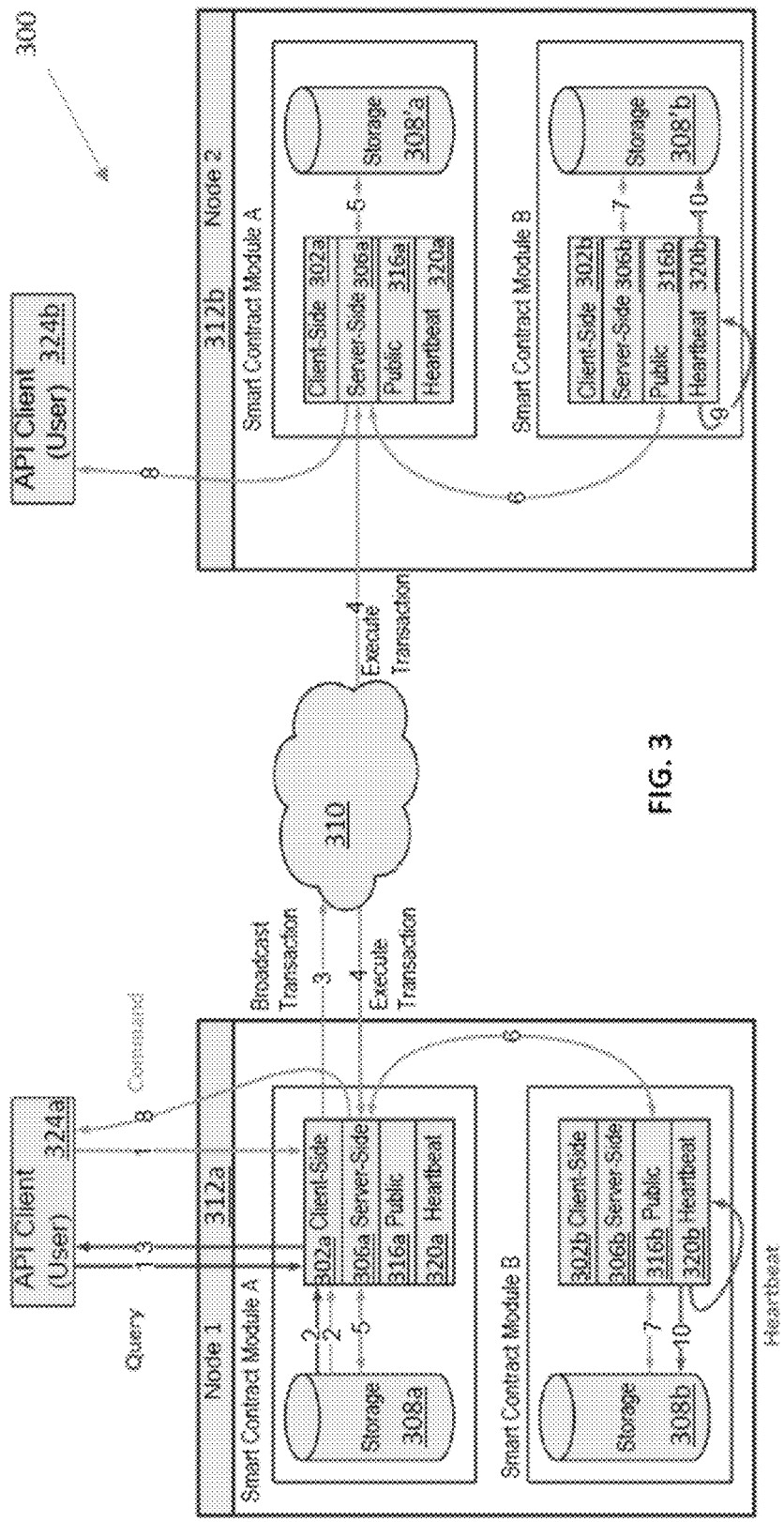
FIG. 3 illustrates an example implementation in a decentralized network of the operation of a smart contract language design disclosed herein.

FIG. 3 illustrates an example implementation 300 of the operation of a smart contract written with the features of the programming language design disclosed herein. According to some embodiments of the disclosure—(1) a user (e.g., API client User 324a) can make a request to the user's node API (e.g., node 312a) with the smart contract module name (e.g., Smart Contract Module A), name of a client-side function (e.g., client-side 302a) and the arguments to that function; (2) that node (and only that node) (e.g., node 312a) can run the client-side function (e.g., client-side 302a), which can read (only) data from its storage (e.g., storage 308a); (3) the client-side function (e.g., client-side 302a) can return and fill the user's request with the return value. These steps include the Query in the CQRS design.

With respect to the Command in the CQRS design—according to some embodiments of the disclosure—(1) a user (e.g., API client User 324a) can make a request to user's node API (e.g., node 312a) with the contract module name (e.g., Smart Contract Module A), name of a client-side function e.g., client-side 302a) and the arguments to that function; (2) that node (and only that node) (e.g., node 312a) can run the client-side function (e.g., client-side 302a), which can read (only) data from its storage (e.g., storage 308a); (3) that client-side function (e.g., client-side 302a) has a side effect which is the creation and broadcast of a new transaction to the decentralized computer network 310. This transaction can include instructions to execute a server-side function (e.g., server-side 306a) of that particular contract module (e.g., Smart Contract Module A) with particular arguments; (4) this transaction can be executed on all nodes (e.g., node 312a and node 312b), running the named server-side function (e.g., server-side 306a); (5) the original server-side function (e.g., server-side 306a) can read from and write to that module's storage (e.g., Smart Contract Module A's storage 308a and Smart Contract Module A's storage 308'a).

In some instances, (6) this server-side function (e.g., server-side 306a), when executed, can call the "public" functions (e.g., Public 316b) of other smart contract modules (e.g., Smart Contract Module B); (7) the public function (e.g., Public 316b) of the other smart contract module (e.g., Smart Contract Module B) can read from and write to that module's storage (e.g., Smart Contract Module B's storage 308b and Smart Contract Module B's storage 308'b)

According to embodiments of this disclosure, (8) the server-side function (e.g., server-side 306a) can return and fill the user's request with the return value; (9) after the execution of every server-side function (e.g., server-side 306a and server-side 306b), every heartbeat function (e.g., Heartbeat 320a and Heartbeat 320b) can be executed; (10) the heartbeat function (e.g., Heartbeat 320b) can read from and write to the storage (e.g., storage 308b) of the smart contract module (e.g., Smart Contract Module B) that contains the heartbeat function.

@Public and/or Modularity Feature

In some instances, smart contract modules can call other smart contract modules only when the callee's functions are marked @public. This represents the API exposed to other smart contract modules. Since each smart contract modules is completely isolated, the caller's storage is protected. The isolated storage is available to the current smart contract module that is executing. All smart contract modules have access to information about the current transaction, such as the signer, transaction ID, timestamp, etc.

Heartbeats

There are situations where a decentralized network system acts on a trigger, particularly time. For example, if a company must pay a dividend every quarter, an external party sends a transaction at the right time to execute payment. Unfortunately, this means that systems outside of smart contract modules are typically required for the proper behavior in this scenario.

According to some embodiments, a @heartbeat function in a smart contract modules is executed every time a transaction of any type is processed. After every "server-side" function is called, the system proceeds to execute all the @heartbeat functions in published smart contract modules. It is up to the @heartbeat code to determine if it is the right time to act. In this way, @heartbeat functions solve the problem illustrated in the example above: if it is the end of the quarter, pay everyone; otherwise, do nothing.

TX Atomicity

All the changes made to all contract storages are marked by the current transaction ID. If any part of this execution fails, all the changes to storage are removed. It is as if the transaction never occurred, much like a database rollback.

Push

The smart contracts platform needs a way to communicate an event via the Node API when a particular event occurs in a smart contract. Other software layered on top can act on those events. For example, if a smart contract module wants to pay another party, it can send a message to trigger an external system connected to a node to issue a payment over the SWIFT interbanking messaging network. The more common case is to send message to a web page to track the progress of a contract's workflow.

According to some embodiments, a PUSH function is a special built-in operation that sends a value to a socket. The socket is exposed externally, where software can handle messages in any of a number of ways.

Generate_ID

Often times one needs to generate a random ID value to use a key in contract storage. Put differently, contract storages include a key-value mapping of relevant data. All the nodes, however, can (or in some embodiments must) generate the same ID value deterministically. If every node generated a different value, then they would no longer have the same view of data. In some instances, the primary use case is to generate a unique value for use as the key in a key/value pair saved in storage. For example, if a contract is to create a new loan and store the details, it can generate a random ID value ("LOAN-7305723") and store the loan at that location: STORAGE["LOAN-7305723"]=newLoan.

Storage

In some embodiments, a persistent way for a smart contract module to save data is through the STORAGE API. In some implementations this can be the only persistent way for a smart contract module to save data. In some implementations, each smart contract module has a secure, isolated region to read and write data, and no other smart contract module can read or write data from that same region. According to some embodiments of the disclosure, the STORAGE API can be a simple key/value interface, and it can support an interface to issue complex queries on the data for a particular smart contract module. The query interface can be independent of the underlying data storage system, providing a high-level mechanism for efficiently retrieving data from storage. In some embodiments, the state of a smart contract is in its storage.

Dynamic API Generation

The functionality of a blockchain system is determined by the set of smart contract modules that are published to a network and available at any given time. For a user accessing the network through a node, that user makes an API call to the node, requesting it to either return a value from its local copy of smart contract module state, or to construct a new transaction which is then broadcast to the network for later parsing. This node API can be dynamically generated by the node software based on the available set of smart contract modules in the network, updated every time a new smart contract module is published.

Client-Side Features

Smart contract modules may include functions that will be executed not on the network broadly, but rather just on the node that is creating/defining transactions. Such functions may serve the purpose of determining how to construct the transactions and how to broadcast, as well as how the current network state is to be interpreted and presented to the user. Client-side code cannot change the state of the node or the network directly, but may only be used to create transactions which do.

"Client-side" functions are distributed in the same way as "server-side" functions, as part of unified smart contract modules. These client-side functions have read-only access to the STORAGE interface. Client-side functions then obviate the need for users to have direct access to the node's database, providing a good abstraction from the details of node implementation.

Post_Transaction

Within this programming systems/methods/model as disclosed herein, a @client-side function/client-side function may submit a transaction by calling an executable with the POST_TRANSACTION built-in. This will construct a transaction; however, it will not be submitted until after the @client-side completes successfully. If the @client-side function fails, the transactions will not be submitted to the network. A @server-side function may also call POST_TRANSACTION, allowing the chaining together of many transactions in a multi-step workflow. In some embodiments, transactions that are constructed/defined within @server-side functions are added to a queue. Upon the return of the @server-side function, all transactions thus defined are broadcast by all nodes that executed the @server-side function, including additionally a deterministically generated nonce (seeded from network state) that allows for deduplication of the new transactions by other nodes. Otherwise transactions constructed in this fashion would be duplicated by all nodes that have executed the @server-side.

In addition, @client-side can submit multiple transactions at a time. In this case, some or all the function calls are actually bundled into a single atomic transaction. For example, a @client-side wishes to call POST_TRANSACTION on completely different functions a, b and c. The function calls will be bundled into a single transaction, which is sent to the network only when the @client-side successfully completes execution. At that time, the transaction is submitted and executed by each function in sequence. If all succeed, the transaction is successful. If any fail, the entire transaction is rolled back.

Future and Fill_Future

According to some embodiments, a decentralized computer network platform of the disclosure executes transactions asynchronously. In some instances, when a client submits a transaction, it can (or in some embodiments must) first be broadcast and accepted by the global network. Once it's added to the queue of pending transactions, it might take a while before the transaction is finally executed. From the client's perspective, they can (or must) submit a transaction and then wait somehow for completion.

Some embodiments of the smart contract programming model described herein includes a FUTURE built-in function to provide a synchronous interface to the system. A client calls a @client-side function to submit a transaction. The @client-side function may call FUTURE( ) to define/create a container for the eventual result. When the @client-side submits a transaction, it also passes along the future as an argument. The transaction is eventually executed by the system, and the program, component, and/or programmer calls FILL_FUTURE to insert a return value into the future and/or future function. Meanwhile, the client is still waiting for a response. When the client's node detects that the transaction has executed, it looks for the filled future or future function and returns that value to the client.

Example Language Integrations

As an example, in some embodiments, methods and systems of the disclosure include a set of extensions to the Python programming language to enforce deterministic execution and to integrate with a blockchain platform.

Methods and systems of the disclosure can simplify distribution of programs. While a program should contain everything used to implement business logic, prior to the discovery of the disclosed methods and systems, it was not possible to do so. In known systems, only server-side code is implemented, and client side logic is manually implemented in a different system, such as a web application.

Embodiments of the disclosure can be implemented in a wide variety of ways and applications. Such implementations can provide numerous benefits, such as supporting client-side and server-side functionality; more elegant code; fewer function calls; a massive reduction of back-office costs and necessary internal controls, due to full dematerialization capabilities and greatly reduced reconciliation burden; increased speed due to extensive reduction of settlement times; enhanced data security, due to the write-once nature of some blockchains and a digital key ownership model; reduction of capital risk due to reduced settlement periods; and/or reduction of structural risk due to possible gross settlement of securities and reduction or elimination of practices like naked shorting.

In some implementations, aspects of the disclosure can be configured for applications such as syndicated and corporate loans to provide: deduplication and digitization of loan information; reduction of extant logs and databases; reduction of trade times via secure electronic clearing and settlement; and/or reduced resource depletion due to process automation and simplified workflows.

In some implementations, aspects of the disclosure can be configured to private equity and/or crowdfunding application to provide features including: end-to-end lifecycle workflow encompassing issuance, primary market allocation (IPO) and secondary market trading; adaptable secondary market trading mechanics that reflect real-time pricing and availability, workable with both low and higher liquidity listings; and/or fully electronic administration of corporate and compliance actions, minimizing resource usage for both the client and the servicer In some implementations, aspects of the disclosure can be configured to provide features for scenarios, such as corporate debt, that include: fee collection at key workflow points (bond issuance, primary market allocation confirmation, trade confirmation, etc.); realtime primary and secondary market operation with greatly reduced settlement times; advanced counterparty discovery and efficient (and lower risk) secondary markets, without inventory requirements placed on dealers; and/or full-automation of any or all corporate actions.

In some implementations, aspects of the disclosure can be implemented in asset digitization, and can provide features that allow: investor exposure to illiquid physical assets in a form that is fungible and easily transacted; owners of illiquid physical assets to access liquidity by selling or pledging digitized assets backed by their physical collateral; digitized assets to be originated and tracked on a decentralized computer network where they may be securely transferred on a peer-to-peer basis; and/or trades involving digitized assets to be settled in a highly efficient and automated manner.

Below is an example implementation according to the disclosure in etcd API; etcd is a reliable distributed key/value database used to coordinate distributed services. For this example, the underlying coordination protocol is RAFT, a non-BFT consensus algorithm. The below example code illustrates the facility of building an API using a smart contract. This implementation is robust as multiple hostile parties can use the same service.

```
@public
def get_direct(key):
    """Get a key value
    This is @public to allow other contract modules to access the key without
    triggering a watch message.
    """
    return STORAGE[key]
@clientside
def get(key):
    """Get a key value
    This is called by clients of the node API. As a
    @clientside, it can only fetch values, but it cannot affect the
    network state at all.
    """
    if STORAGE['watchlist'].contains(key).query( ):
        PUSH({'type': 'watch', 'action': 'get', 'key': key})
    return get_direct(key)
@public
def put_direct(key, value):
    """Put a key/value pair
    Called by other contract modules.
    """
    STORAGE[key] = value
@serverside
def put(key, value, prevVal = "", lease_id = None):
    """Put key/value, support CAS and leases.
    This operation is submitted to the network. It updates a
    key/value pair. But it also has some other features. If prevVal is
    set, it only updates storage if that is the current value in
    storage. This is a compare-and-swap operation used to atomically
    update state. The lease_id is used to attach this key to a
    timer. When the lease timer expires, this key is automatically
    deleted.
    """
    write = True
    if STORAGE['watchlist'].contains(key).query( ):
        PUSH({'type': 'watch', 'action': 'put', 'key': key})
    if prevVal:
        pv = STORAGE[key]
        if not pv == prevVal:
            write = False
    if write:
        put_direct(key, value)
        if lease_id:
            lease = STORAGE[lease_id]
            if lease:
                lease.append(key)
                STORAGE[lease_id] = lease
@public
def del_direct(key):
    """Delete a key.
    """
    value = STORAGE[key]
    STORAGE[key] = None
    return value
@clientside
def del_safe(my_id, key):
    """Client interface to delete a key.
    An client of the node AIP calls this function, which
    validates that the key actually exists. If so, it submits
    the operation to the network. It also creates a future, which
    means this function blocks until the network actually deletes the
    key. When the key is finally deleted, this function will return the
    value that was attached to the key.
    """
    if STORAGE[key]:
        future = FUTURE( )
        key_alias =CALL('pseudonyms.get_key_alias', my_id)
        POST_TRANSACTION(key_alias, 'etcd', 'del', future=future, key=key)
        return future
    else:
        return None
@serverside
def del(future, key):
    """Delete a key.
    Deletes a key and sends a message externally. It also passes back
    the old value to the calling client using a future.
    """
    if STORAGE['watchlist'].contains(key).query( ):
        PUSH({'type': 'watch', 'action': 'del', 'key': key})
    old_value = del_direct(key)
    FILL_FUTURE(future, old_value)
# Watch
@serverside
def watch(key, remove = False):
    """Push a message whenever this key is touched by an external operation.
    """
    wl = STORAGE['watchlist']
    if remove:
        wl.remove(key)
    else:
        wl.append(key)
    STORAGE['watchlist'] = wl
# Leases
@serverside
def grant_lease(time):
    """Create a lease that expires in a certain amount of time.
    In this case "time" really means the number of transactions.
    """
    lease_id = GENERATE_ID('lease')
    leases = STORAGE['leases']
    tx_id = TX['tx_index']
    leases[lease_id] = time
    STORAGE['leases'] = leases
    STORAGE[lease_id] = [ ]
    return lease_id
@serverside
def revoke_lease(lease_id) -> bool:
    """Remove a lease
    """
    lease = STORAGE[lease_id]
    if lease:
        for key in lease:
            del(key)
        STORAGE[lease_id] = None
        leases = STORAGE['leases']
        del leases[lease_id]
        STORAGE['leases'] = leases
        return True
    else:
        return False
@heartbeat
def expire_leases( ) -> NoneType:
    """Maintain the leases.
    @heartbeat means every time a transaction -- *any transaction* --
    executes on this system, run this code. This code deducts 1 from the
    lease timers. If the lease count is 0, it is removed from the list.
    """
    leases = STORAGE['leases']
    new_leases = { }
    for l, t in leases.items( ):
        if t:
            new_leases[l] = t-1
    STORAGE['leases'] = new_leases
```

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, disclosed embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

According to some embodiments, disclosed is computer processor-implemented method that enable a consistent view of data across a plurality of nodes in a decentralized network, the method comprising: publishing, via at least one node in the plurality of nodes, a smart contract module to the decentralized network, the smart contract module including at least one function; at a first node in the plurality of nodes: in response to execution of a client-side functionality in the at least one function, broadcasting at least one transaction on the decentralized network to generate a broadcasted transaction; for each node in the plurality of nodes: in response to the broadcasted transaction, executing a server-side functionality in the at least one function, the broadcasted transaction including an identifier for the server-side functionality; and in response to executing the server-side functionality, generating a unique pseudorandom ID value; and storing the data in a storage associated with the smart contract module. In some embodiments, in response to executing the server-side functionality each node in the plurality of nodes generate the same pseudorandom ID value in a deterministic manner using a decentralized network state as a seed. In some embodiments, in response to executing the server-side functionality each node in the plurality of nodes generate the same pseudorandom ID value in a deterministic manner.

According to some embodiments, a multi-server implemented method for applying or instantiating a smart contract module on a decentralized network is disclosed, the decentralized network being configured to enable peer-to-peer connection amongst a plurality of nodes, the multi-server implemented method comprising: publishing, via at least one node in a plurality of nodes, a smart contract module to a decentralized network, the smart contract module including at least one function; at a first node in the plurality of nodes: triggering execution of a client-side functionality in the at least one function, the client-side functionality being triggered in response to a request placed via the first node's Application Programming Interface (API); in response to the execution of the client-side functionality on the first node: accessing a state of the first node from a storage associated with the smart contract module, and constructing at least one transaction; and broadcasting the at least one transaction on the decentralized network to generate a broadcasted transaction; for each node in the plurality of nodes: in response to the broadcasted transaction, executing a server-side functionality in the at least one function, the broadcasted transaction including an identifier for the server-side functionality; and in response to executing the server-side functionality, changing a corresponding state of that node.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer implemented method for implementing a smart contract module on a decentralized network, the decentralized network configured to enable peer-to-peer connection amongst a plurality of nodes, the computer-implemented method comprising:

publishing, via at least one node in the plurality of nodes, the smart contract module to the decentralized network, the smart contract module including at least one function comprising client-side functionality to be run on a single node in the plurality of nodes and server-side functionality to be run on the single node and on one or more other nodes in the plurality of nodes, the publishing comprising communication of an electronic message either point-to-point or within a distributed consensus protocol, communication of the electronic message using the distributed consensus protocol comprising appending the electronic message to a log structure accessible by other network nodes;

at a first node in the plurality of nodes only and not at any other nodes in the plurality of nodes:

triggering execution of the client-side functionality in the at least one function, the client-side functionality being triggered in response to a request placed via the first node's Application Programming Interface (API), the execution of the client-side functionality comprising read-only queries of a state of the first node, wherein the state of the first node is stored in a persistent storage volume or volatile system memory in electronic communication with the first node, wherein the client-side functionality is executed in a stateless virtual machine environment isolated from all other client-side execution function calls, the execution of the client-side functionality occurring on only the first node and the execution of the client-side functionality having no effect on a state of any node except through construction and broadcast of one or more transactions to the decentralized network, the one or more transactions once broadcasted being validated and executed independently of the execution of the client-side functionality; and in response to the execution of the client-side functionality on the first node:
accessing a state of the first node from a storage associated with the smart contract module using the virtual machine environment for the execution of the client-side functionality,
constructing/defining one or more transactions as electronic messages based at least in part on the state of the first node determined from executing the client-side functionality the electronic messages comprising commands that trigger server-side contract functionality with contract functionality arguments based on client-side contract logic, the commands invoking the server-side functionality to be executed in a virtual machine environment on at least one node within the decentralized network, and
broadcasting the one or more transactions on the decentralized network to generate a broadcasted transaction,
thereby constructing/defining and broadcasting the one or more transactions on the decentralized network based at least in part on the state of the first node determined from executing the client-side functionality on the first node and without executing the server-side functionality that is part of the smart contract module on any node on the decentralized network;

for each node in the plurality of nodes on the decentralized network, including the first node and one or more other nodes on the decentralized network:
in response to the broadcasted transaction, executing the server-side functionality in the at least one function, the server-side functionality enabling each node in the plurality of nodes, including the first node, to read from and write to the storage associated with the smart contract module, the broadcasted transaction including an identifier for the server-side functionality; and
in response to executing the server-side functionality:
constructing/defining one or more transactions as electronic messages comprising commands that trigger server-side contract functionality with contract functionality arguments based on server-side contract logic, the commands invoking the server-side functionality to be executed in the virtual machine environment on at least one node within the decentralized network;
broadcasting the transaction(s); and
reading a node state by accessing in a read/write mode within the virtual machine execution environment on at least one node within the decentralized network; and
one or more of:
triggering execution of one or more heartbeat functions that have been registered previously according to specified triggers;
changing a corresponding state of at least a portion of the node; or
generating other side effects;
wherein each of the plurality of nodes comprises one or more computer systems having one or more processors and one or more electronic storage medium.

2. The computer-implemented method of claim 1, wherein the client-side functionality in the at least one function is configured to provide read-only access to the persistent storage volume or volatile system memory in electronic communication with the first node.

3. The computer-implemented method of claim 1, wherein the server-side functionality in the at least one function is configured to provide write access to a corresponding storage associated with the smart contract module in each node in the plurality of nodes.

4. The computer-implemented method of claim 1, further comprising:
in response to the execution of the client-side functionality on the first node:
transmitting a result of a computation based on the state of the first node via the first node's API.

5. The computer-implemented method of claim 1, further comprising:
in response to executing the server-side functionality on each node in the plurality of nodes, triggering a side effect on that node.

6. The computer-implemented method of claim 1, wherein the one or more transaction includes a plurality of transactions and broadcasting the one or more transaction includes ordering the plurality of transactions by a distributed consensus protocol to generate an ordering of transactions.

7. The computer-implemented method of claim 1, wherein the storage associated with the smart contract module is an isolated storage.

8. The computer-implemented method of claim 1, wherein the storage associated with the smart contract module manages state associated with a logic corresponding to the smart contract module.

9. The computer-implemented method of claim 1, wherein implementing the smart contract module further comprises:
in response to the broadcasted transaction, triggering the transaction in a corresponding virtual machine on each node in the plurality of nodes in the decentralized network.

10. The computer-implemented method of claim 3, wherein the corresponding storage associated with the smart contract module in each node in the plurality of nodes comprises one or more of a persistent storage volume or volatile system memory.

11. The computer-implemented method of claim 1, wherein the one or more transactions are cryptographically signed.

12. The computer-implemented method of claim 1, wherein the other side effects comprises one or more PUSH events.

13. The computer-implemented method of claim 1, wherein the smart contract module digitally represents behavior of a financial instrument in the decentralized network.

14. The computer-implemented method of claim 1, wherein the smart contract module maintains a single source of truth in the decentralized network.

15. The computer-implemented method of claim 1, wherein the smart contract module comprises one or more consistency guarantees or properties.

16. The computer-implemented method of claim 1, wherein the smart contract module orchestrates and restricts behavior of multiple parties in multi-party workflows within the decentralized network.

17. The computer-implemented method of claim 1, wherein at least a portion of the method utilizes Command Query Responsibility Segregation (CQRS).

* * * * *